April 11, 1933. W. SYKES 1,903,638
STRETCHING MACHINE
Filed July 3, 1931 9 Sheets-Sheet 1

April 11, 1933. W. SYKES 1,903,638
STRETCHING MACHINE
Filed July 3, 1931 9 Sheets-Sheet 5

Inventor:
Wilfred Sykes.
By Dyrenforth, Lee, Chritton & Wiles
Attys.

April 11, 1933. W. SYKES 1,903,638
STRETCHING MACHINE
Filed July 3, 1931 9 Sheets-Sheet 6

Inventor:
Wilfred Sykes,
By Dyrenforth, Lee, Chritton & Wiles
Attys.

April 11, 1933.  W. SYKES  1,903,638
STRETCHING MACHINE
Filed July 3, 1931  9 Sheets-Sheet 7

Inventor:
Wilfred Sykes
By Dyrenforth, Lee, Chritton & Wiles
Attys

Patented Apr. 11, 1933

1,903,638

UNITED STATES PATENT OFFICE

WILFRED SYKES, OF CHICAGO, ILLINOIS, ASSIGNOR TO INLAND STEEL COMPANY, OF CHICAGO, ILLINOIS, A CORPORATION OF DELAWARE

STRETCHING MACHINE

Application filed July 3, 1931. Serial No. 548,675.

My invention relates to machines for stretching elongated metal objects as for example of steel, such as plates, bars and the like, more particularly for the purpose of rendering them straight, and more especially, but not exclusively, to the stretching of cambered so-called universal mill plates the widths of which are more than thirty times their thicknesses, primarily for the purpose of rendering their equidistantly spaced rolled edges straight and parallel.

My primary object, generally stated, is to provide improvements in machines of the character above stated to the end that the material after being stretched may be more expeditiously removed from the machine and preferably more expeditiously introduced into, and removed from, the machine, and other objects as will be manifest from the following description.

Referring to the accompanying drawings.

Figure 1:
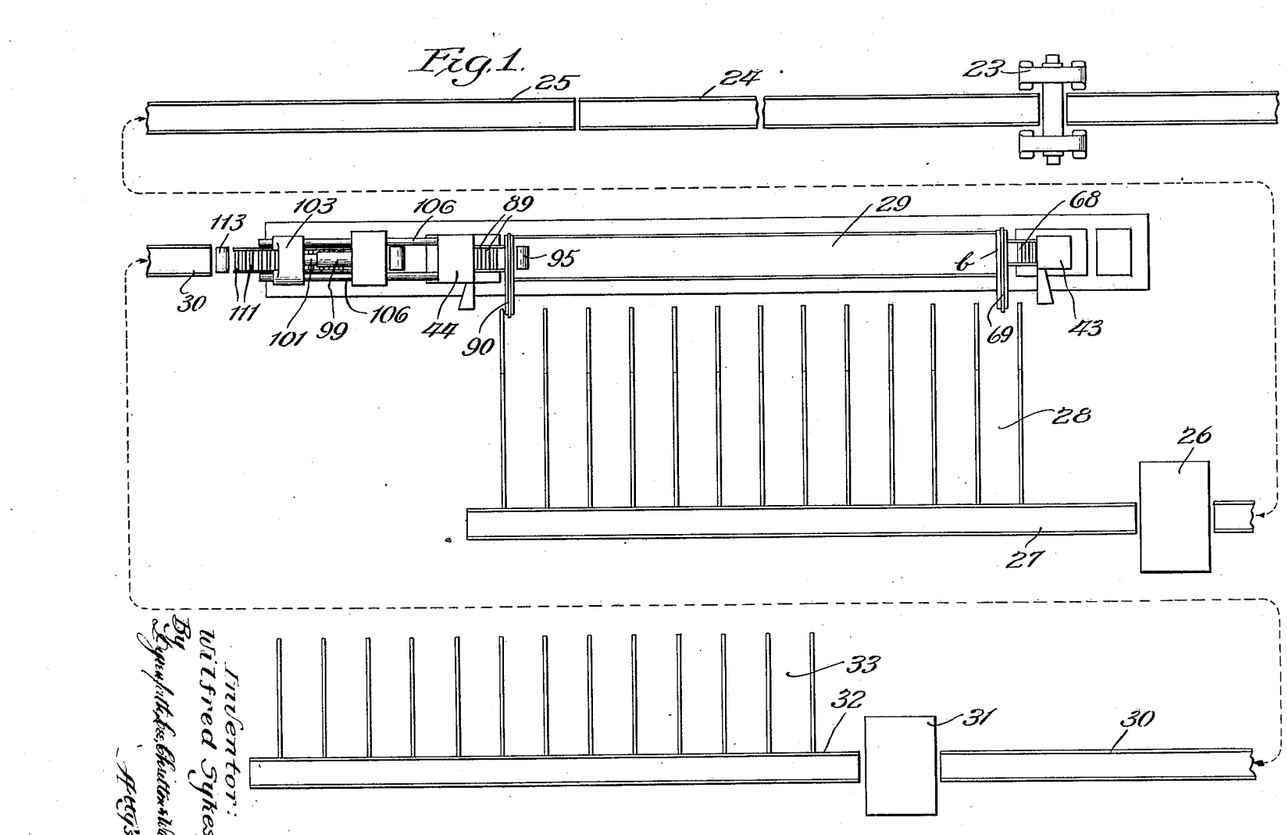
Figure 1 is a plan view, somewhat diagrammatic, of a mill layout for rolling plates and stretching mechanism and plate transfer mechanism embodying my invention.

Referring first to Fig. 1, this figure shows a mill layout for rolling plates, a stretching machine in accordance with my invention, shearing means for the plates, means whereby the plates are delivered sidewise to the machine and means for conveying the plates from the stretching machine.

In this arrangement 23 represents, by a diagrammatic showing, a continuous rolling mill for rolling universal plates, 24 a conveyor runout table for the plates after they discharge from the mill 23, 25 a shear-approach conveyor table, 26 shearing mechanism for shearing the ends of the plates, 27 a shear runout conveyor table, 28 skids along which the plates are moved sidewise, 29 my improved stretching machine for stretching the plates delivered to it along the skids 28, 30 a shear approach conveyor table to which the plates, after being stretched on the machine 29, are delivered endwise, 31 mechanism for shearing the ends of the plates after the stretching operation, 32 a second shear runout conveyor table; and 33 loading skids to which the plates are delivered sidewise.

Figures 2, 3:
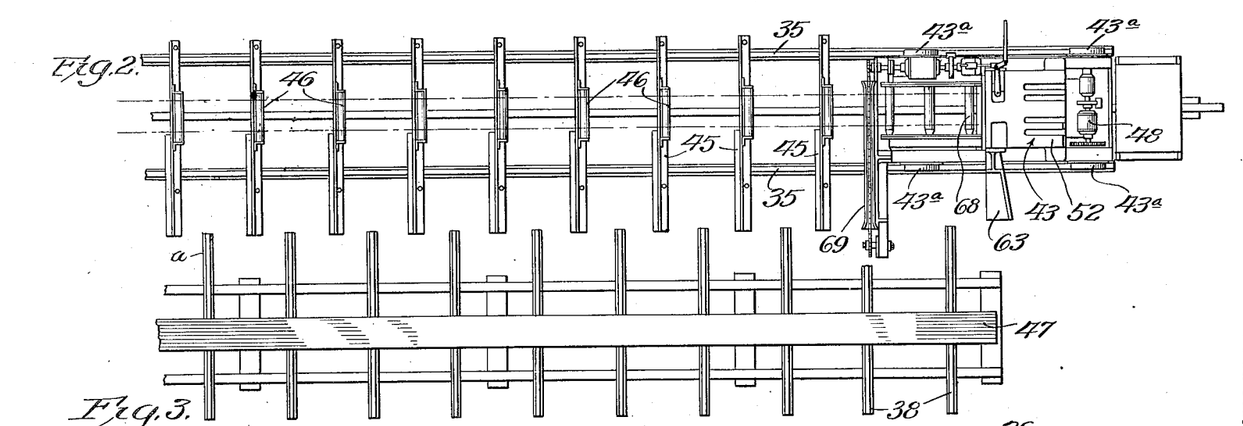
Figure 2 is a plan view of one end of the stretching mechanism of Fig. 1 and the means for delivering the plates thereto.
Figure 3 is a broken view in side elevation of the portion of the stretching mechanism shown in Fig. 2.

The stretching machine 29 comprises a relatively heavy base member 34 equipped with parallel tracks 35, an inverted arch-like girder 36 securely anchored at its depending legs 37 and 38 in the base member 34 and extending parallel with the tracks 35, and upper and lower tension bars 39 and 40 extending through the leg 38 and held against movement to the left in Fig. 3 by bars 41 and 42 extending through openings therein and engaging the leg 38, the bars 39 and 40, which extend along the girder 36, containing a series of slots 41$^a$ and 42$^a$, respectively.

Located in the space provided by the arch-like girder 36 and the base-member 34 are two carriages 43 and 44 equipped with wheels 43$^a$ and 44$^a$, respectively, at which they are supported on, and are movable along, the tracks 35. The carriages 43 and 44 are provided for receiving and clamping the ends of the plates delivered thereto along the skids 28 and by movement of the carriage 43 in a direction away from the carriage 44 stretch the plates for removing camber and thereby render their lateral rolled equidistantly spaced edges straight and parallel.

The machine also comprises a series of removable and replaceable frames 45 extending crosswise of the machine and located between the carriages, these frames, which are staggered relative to the rail members comprising the skids 28, and serve to receive the plates as they slide from the skids 28, being equipped with horizontal rollers 46 which extend below, and in vertical alinement, with, the plates to be stretched and represented at 47 when the latter are positioned in the machine.

The carriage 43 which serves to anchor the plate 47 at one end while stretching force is exerted against it at its opposite end by the carriage 44 is shown as equipped with a reversible motor 48 provided with a pinion 49 meshing with a gear 50 on the shaft 51 to which one set of the wheels 44$^a$ are rigidly secured, whereby the carriage may be adjusted to the desired position along the tracks for handling any length of plate, the control (not shown) for the motor 48 and which may be of any desirable construction being located at a point common to the various other controls of the mechanisms hereinafter described, it being understood that such of the frames 45 as would interfere with the adjusting of the carriage 44 to the desired position would be removed.

The frame of the carriage 44 supports a heavy block 52 slotted along its top and underside, as represented of its top at 53, to receive the tension bars 39 and 40, respectively, to which the carriage is anchored in its position of adjustment along the tracks by bars 54 slidable on the block into and out of the particular openings in the tension bars with which they register, these bars 54 being pivoted to links 55 pivoted at 55$^a$ to arms 56 on a vertical shaft 57 journaled on the block and provided with an operating lever 58.

The face of the block 52 contains a recess 59 extending crosswise of the carriage, in which plate-gripper jaws 60 are located, these jaws being journaled at stub shafts 61 in a plate 62 and a guide member 63 at opposite ends of the recess 59. The recess 59 opens through the side of the block facing the skids 28, and registers with the outwardly flaring throat 64 of the member 63 for the guidance of the adjacent ends of the plates to position within this recess. The jaws 60 are so shaped as shown that when actuated to be moved toward the opposite end of the machine they approach each other to perform the gripping function and when moved in the opposite direction they spread apart.

Figures 18, 19, 20, 21:
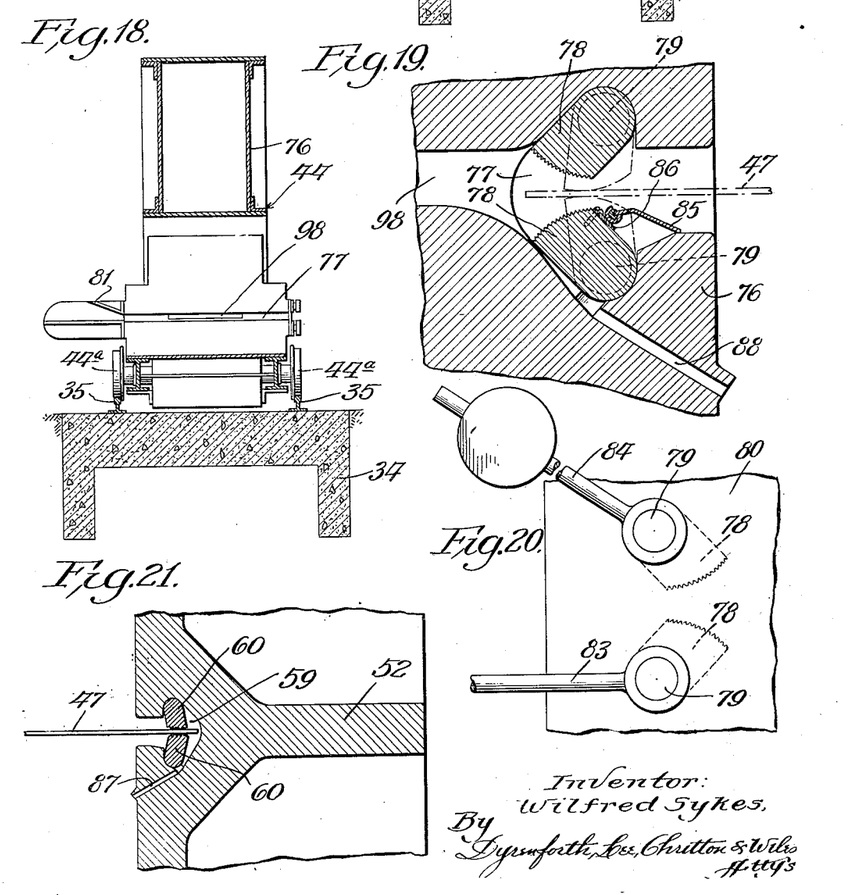
Figure 18 is a section taken at the line 18—18 on Fig. 5 and viewed in the direction of the arrows.
Figure 19 is a broken view in sectional elevation of a portion of the carriage of Fig. 12 showing the plate-clamping jaws of the carriage.
Figure 20 is a broken view in side elevation of the structure of Fig. 19.
Figure 21 is a broken, enlarged, sectional view of the carriage of Fig. 14 showing the plate-clamping jaws of this carriage.

The jaws 60 are connected together, for simultaneous movement, by segmental gears 60$^a$, the lower one of said jaws being provided with a lever handle 65 operating when depressed to rotate this jaw, and by reason of the gears 60$^a$, the upper jaw, toward clamping position, the upper jaw 60 being provided with a lever 66 weighted at 67 and provided to substantially counterbalance this jaw structure, whereby these jaws remain in the position to which they are operated by means of the lever 65. Fig. 21 showing the jaws of this carriage in the position for clamping the adjacent end of the plate 47.

The carriage 43 is also provided in front of the block 52 with a horizontal series of rollers 68 upon which the plate 47 rests upon being introduced into the machine.

Means are provided on the carriages 43 and 44 for feeding the plates into the proper position crosswise of the machine. These means for the carriage 43 are represented generally at 69 and comprise a conveyor chain 70 mounted on sprockets 71 and 72 to extend crosswise of the machine and into a position beneath the plates as they slide downwardly along the skids 28. The sprocket 71 is journaled on an extension 73 of the carriage 43 and the sprocket 72 is carried on the shaft 74 of an electric motor 75 mounted on the carriage, the control for this motor being preferably located at the common control point above referred to.

The carriage 44 is likewise formed of a heavy block 76 containing a recess 77 extending crosswise of the carriage in which plate-gripper jaws 78 are located these jaws being journaled at stub shafts 79 in a plate 80 at one end of the recess 77 and a guide member 81, like the guide member 63, at opposite ends of the recess 77. The recess 77 opens through the side of the block 76 facing the skids 28, and registers with the outwardly flaring throat 82 of the member 81 for the guidance of the adjacent ends of the plates to position them within the recess 77. The jaws 78 are of the same construction as the jaws 60 and are connected together by gears as in the case of the jaws 60 and with levers 83 and 84 corresponding with, and functioning in the same way as, the respective levers 65 and 66.

The lower one of the jaws 60 and the lower one of the jaws 78 are provided with means for preventing rust or scale which may become detached from the plates in the gripping operation from dropping into the bottoms of the recesses in which these jaws operate. These means which are of the same construction for each set of jaws comprise a plate indicated at 85 which is pivoted, as represented at 86, to the lower jaw and slides along the bottom wall of the recess 77. The blocks 52 and 76 contain passages represented at 87 and 88, respectively, which open at their upper ends into the recesses 59 and 77, respectively, and at their lower ends through the faces of these blocks to serve as drains for metal chips, oil, etc., which may become deposited in these recesses.

The carriage 44 is also provided with a horizontal series of rollers 89 upon which the plates rest upon becoming positioned in the machine.

The means cooperating with the conveyor arrangement 69 above described, for delivery of the plates into the proper position in the machine are represented at 90 and comprise a conveyor chain 91 mounted on the idler sprocket 92 and a sprocket 93 driven by an electric motor 94 on the carriage 44 the control for which is located at the common control point above referred to.

It may here be stated that after the plate has been operated on as hereinafter described to stretch it, the plate is moved endwise to the left in Fig. 1 through the carriage 44 and the mechanism hereinafter described for operating this carriage, the carriage to this end being provided with a magnetic roller 95 upon which the plate 47 when positioned in the machine is superposed, this roller which is magnetized to provide traction between it and the plate above it in accordance with common practice, being shown as driven by an electric motor 96 mounted on the carriage 44. The carriage 44 at the rear of the block 76 is provided with a horizontal series of roller disks 97 serving as supports for the plate at this point in the operation of conveying the plate endwise out of the machine, the block 76 containing a passage 98 opening at one end into the recess 77 and at its opposite end through a face of the block 76, the opening thus provided through the carriage permitting of the above referred to endwise movement of the plate therethrough.

The carriage 44 is associated with hydraulically operated mechanism for actuating this carriage to exert sufficient pulling force for stretching the plate 47 (held at its opposite end by the carriage 43) into the desired straightened condition, this mechanism comprising horizontal upper and lower hydraulic cylinders 99 and 100 vertically spaced apart to permit of the endwise movement of the plate 47 therethrough in the conveying of this plate out of the machine, the cylinders 99 and 100 being rigidly secured to the leg 37. This mechanism also includes pistons 101 and 102 in the cylinders 99 and 100, respectively, which are connected at their outer ends with a cross head 103 supported on rollers 104 journaled on a stationary upright 105, the cross head 103, which is rigidly connected with the carriage 44 by means of rods 106 spaced apart a greater distance than the width of the plate 47, containing an opening 107 therethrough which is in horizontal alinement with the slot 98 in the carriage 44 and with a horizontal slot 37ª in the leg 37 and serves to permit the plate 47 to be moved lengthwise through the cross head, the cross head 103 being connected with the ends of chains 108 trained over pulleys journaled on a stationary part of the machine and provided at their free ends with weights 110 which operate when the hydraulic mechanism referred to is conditioned to permit of the exhaust of actuating fluid from the cylinders 99 and 100, to move the cross head 103, together with the carriage 44 toward the carriage 43.

The fluid for actuating the hydraulic mechanism described is supplied to, and exhausted from, the cylinders 99 and 100 in any suitable way as for example in accordance with the common practice of actuating hydraulic mechanism, the control therefor being preferably located at the common control point hereinbefore referred to.

Located in the space between the hydraulic cylinders 99 and 100 and in the space beyond the cross head 103 are horizontal rollers 111 forming roller supports for the bar 47 in the lengthwise movement of the latter or out of the machine, the machine also being equipped with magnetic drive rollers 112 and 113 upon which the plate 47 rests and by which it is driven through the machine, these rollers being mounted on shafts 114 and 115 connected by bevel pinions 116 and 117 with bevel pinions 118 and 119 secured to a rotatable shaft 120 driven, through the medium of reduction gearing 121, from a motor 122 located at the side of the machine.

In the operation of the apparatus shown the plate to be straightened, upon being delivered to the shear runout table 27 and opposite the skids 28, is slid crosswise along these skids into a position in which it becomes engaged by the conveyor chains 70 and 91 which operate to move the plate into a centralized position in the machine, the ends of the plate passing into the flaring throats of the guides 63 and 81, respectively, and being guided thereby into the recesses 59 and 77, respectively, and between the members of the pairs of jaws 60 and 78 as shown in Figs. 21 and 19, respectively, the operator having preliminarily swung the levers 65 and 83 upwardly to cause the jaws 60 and 78 to be out of plate-obstructing position.

It may be here stated that, as will be readily understood, the carriage 43 is adjusted along the machine toward the carriage 44, to cause it to be spaced the desired distance from the latter for operating on plates of a given length, such of the frames 45 as may interfere with the desired adjustment of the carriage 43 being removed. Upon adjusting the carriage 43 to the desired position the bars 54 which form keys are projected into the registering ones of the openings 41ª and 42ª in the tension bars 39 and 40, respectively.

Following the positioning of the plate 47 within the jaws of the carriages 43 and 44 as above stated, the operator swings the jaws 60 and 78 into a position for properly gripping the ends of the plate by applying downward pressure against the levers 65 and 83.

Figure 4:
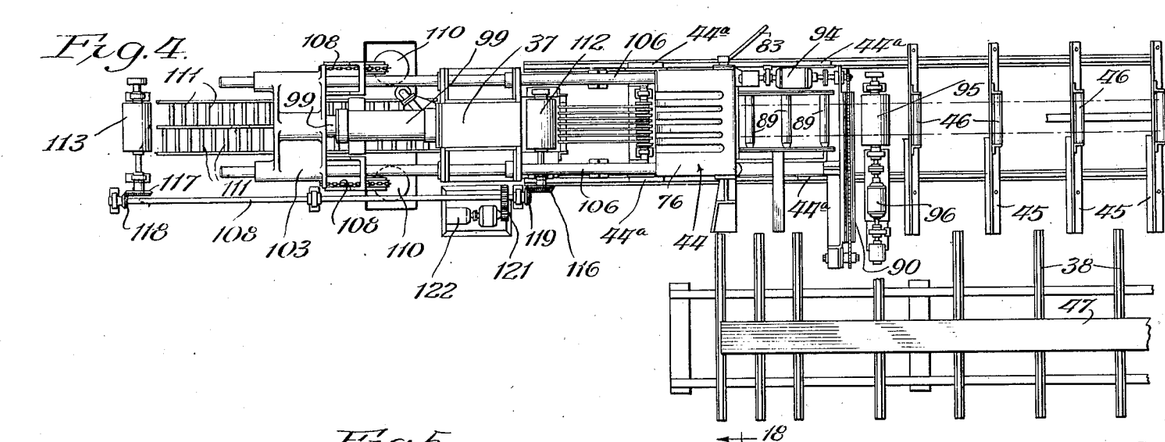
Figure 4 is a view like Fig. 2 of the other end of the stretching mechanism and the adjacent portion of the means for delivering the plates thereto.
Figure 5:
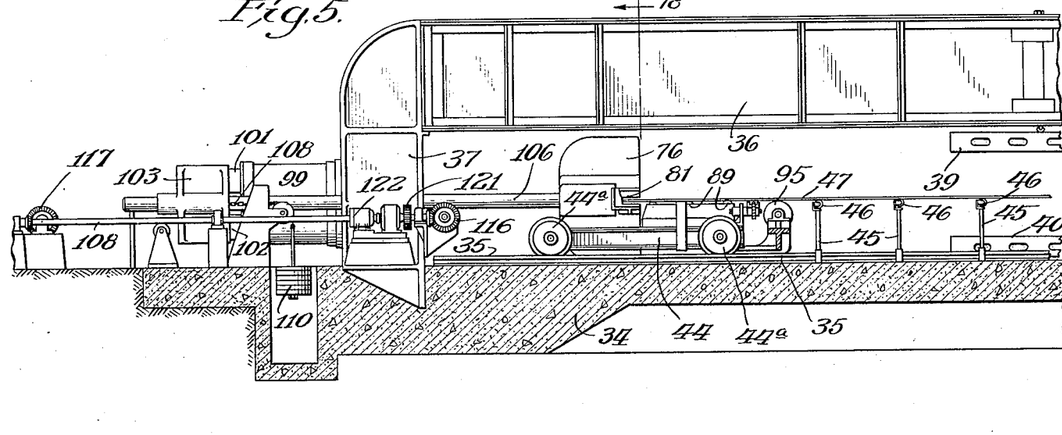
Figure 5 is a view in sectional elevation of the portion of the stretching mechanism shown in Fig. 4.
Figure 6:
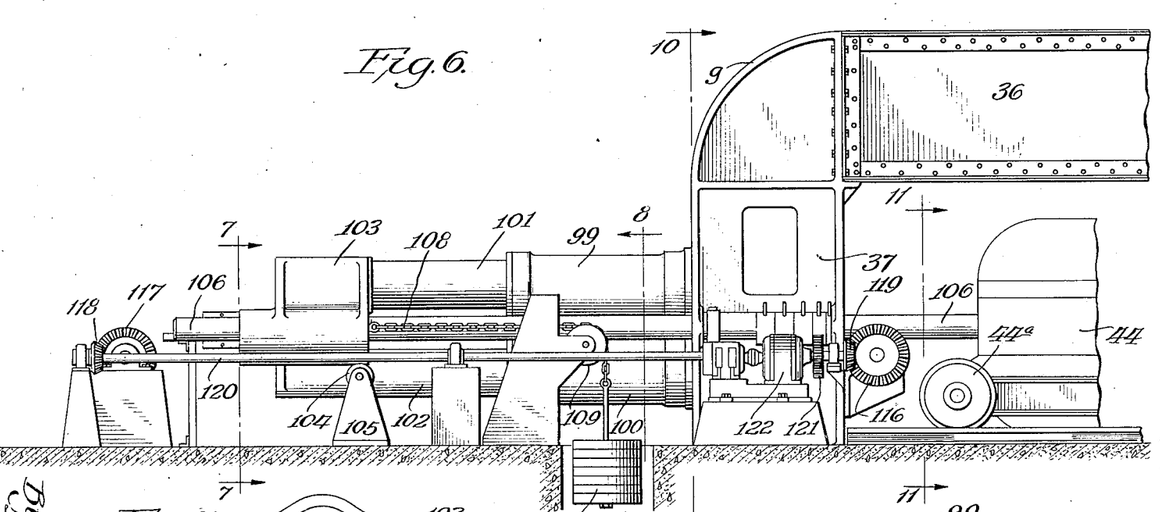
Figure 6 is an enlarged view, in side elevation, of the end of the machine shown in Fig. 4.
Figure 7:
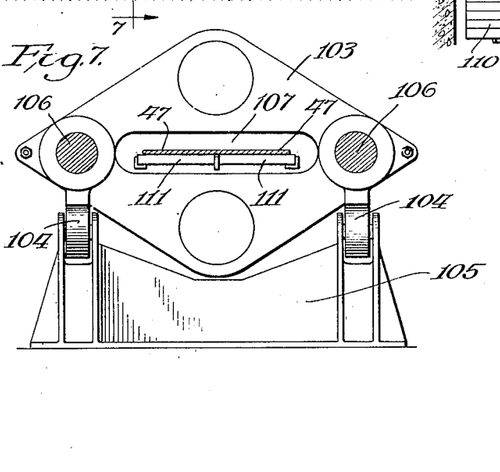
Figure 7 is a section taken at the line 7—7 on Fig. 6 and viewed in the direction of the arrows.
Figure 8:
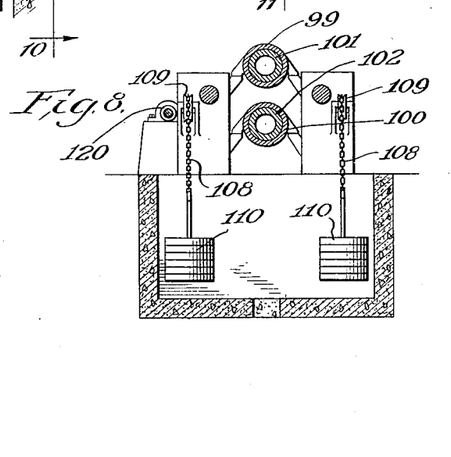
Figure 8 is a section taken at the line 8—8 on Fig. 6 and viewed in the direction of the arrows.
Figure 9:
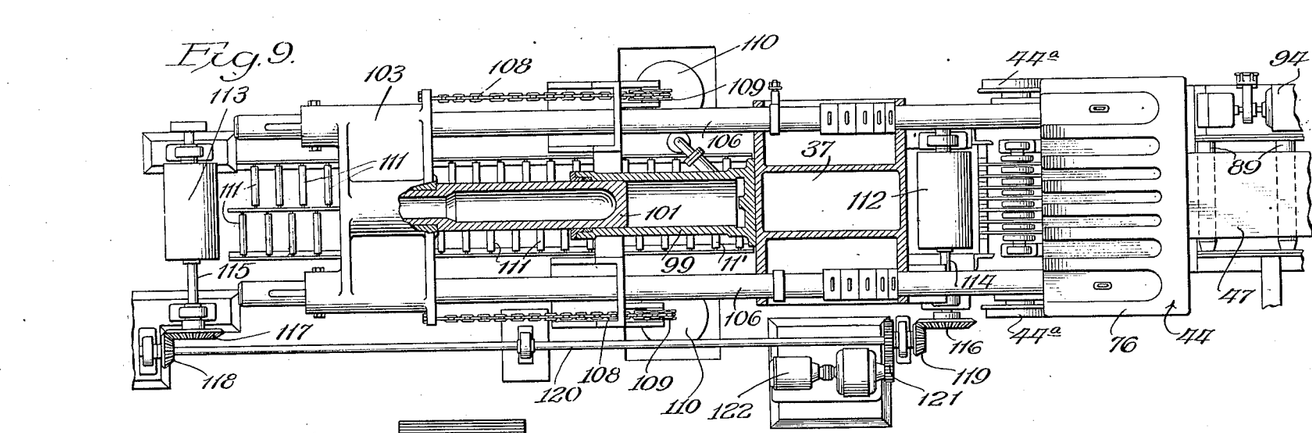
Figure 9 is an enlarged plan view, partly sectional, of the end of the machine shown in Fig. 4.
Figure 10:
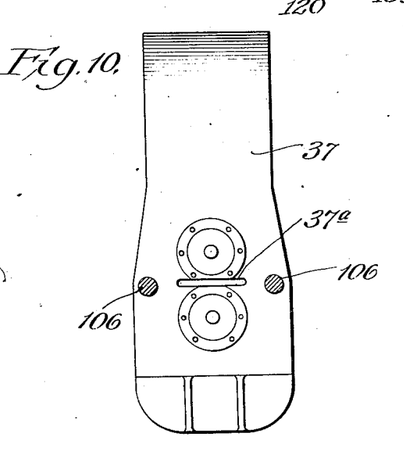
Figure 10 is a reduced sectional view, the section being taken at the line 10—10 on Fig. 6 and viewed in the direction of the arrows.
Figure 11:
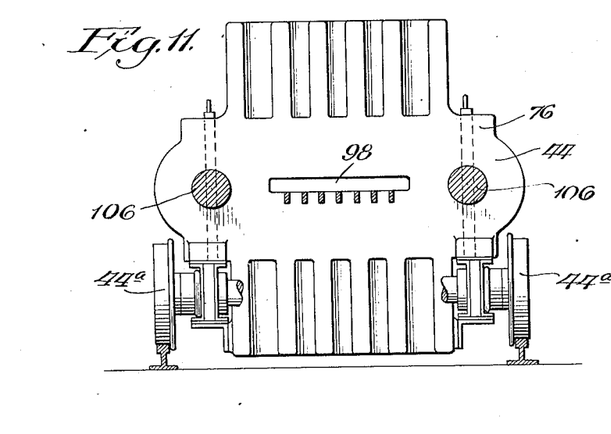
Figure 11 is a section taken at the line 11—11 on Fig. 6 and viewed in the direction of the arrows.
Figures 12, 13:
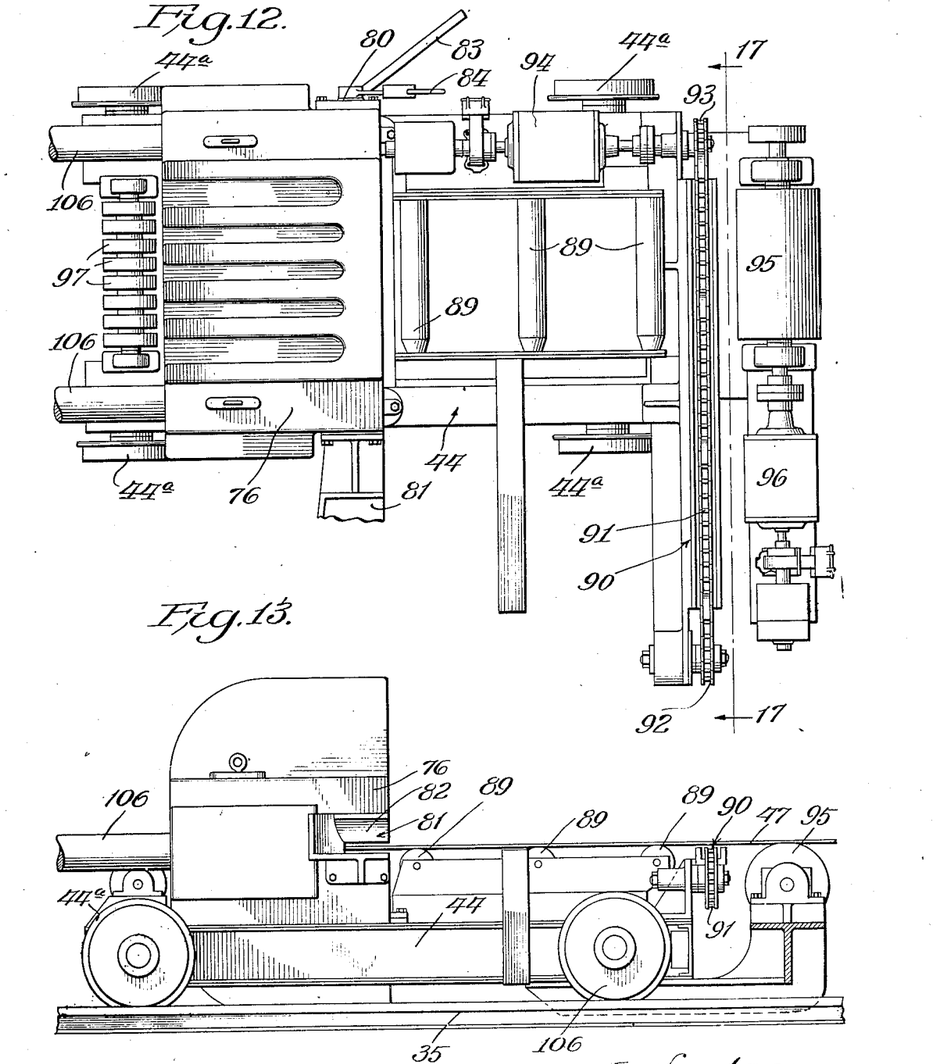
Figure 12 is an enlarged plan view of the carriage at the left-hand side of Fig. 1.
Figure 13 is a view in side elevation of the structure shown in Fig. 12.
Figures 14, 15, 16:
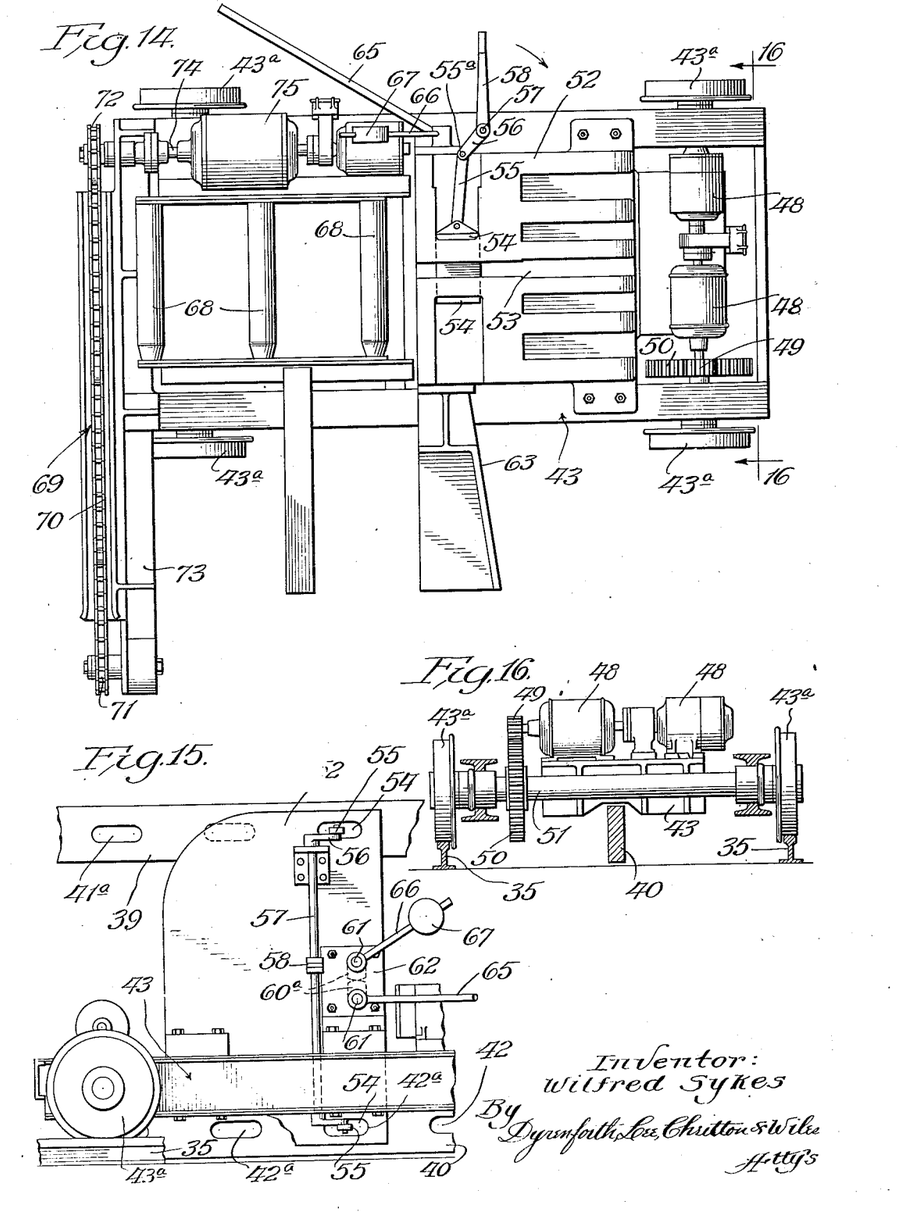
Figure 14 is a plan view of the carriage at the right-hand side of Fig. 1.
Figure 15 is a view in side elevation of a portion of the carriage at the right-hand side of Fig. 1 viewing it from the side opposite that at which it is viewed in Fig. 3.
Figure 16 is a section taken at the line 16—16 on Fig. 14 and viewed in the direction of the arrows.
Figure 17:
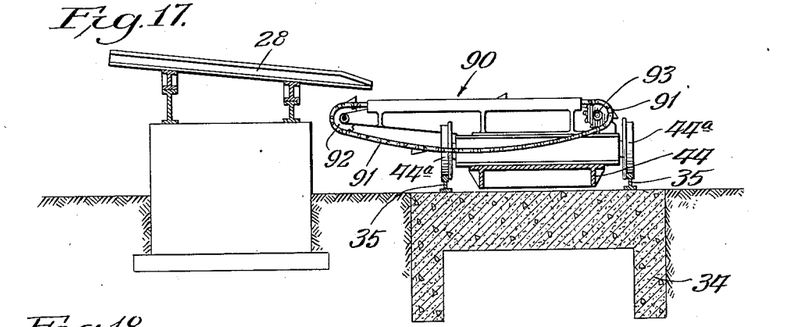
Figure 17 is a section taken at the line 17—17 on Fig. 12 and viewed in the direction of the arrows.

The hydraulic mechanism above described is then operated to move the carriage 44 in a direction away from the carriage 43 to effect the desired plate stretching action upon completion of which the hydraulic mechanism is conditioned to relieve the tension on the plate whereupon the clamping engagement of the jaws with the ends of the plate is released and the plate is then ready for delivery endwise out of the machine this being effected by actuating the magnetic rollers 95, 112 and 113 which carries the plate to the left in Fig. 4 out, to, and upon the shear approach table 30.

The travel of the carriage 44, as will be understood, is limited by the stroke of the pistons 101 and 102, the distance between the slots in the tension bars 39 and 40 being preferably slightly less than the piston stroke referred to, so as to provide sufficient movement to take care of plates which do not correspond in length to the exact distances between the carriages corresponding to the slot locations.

Figure 22:
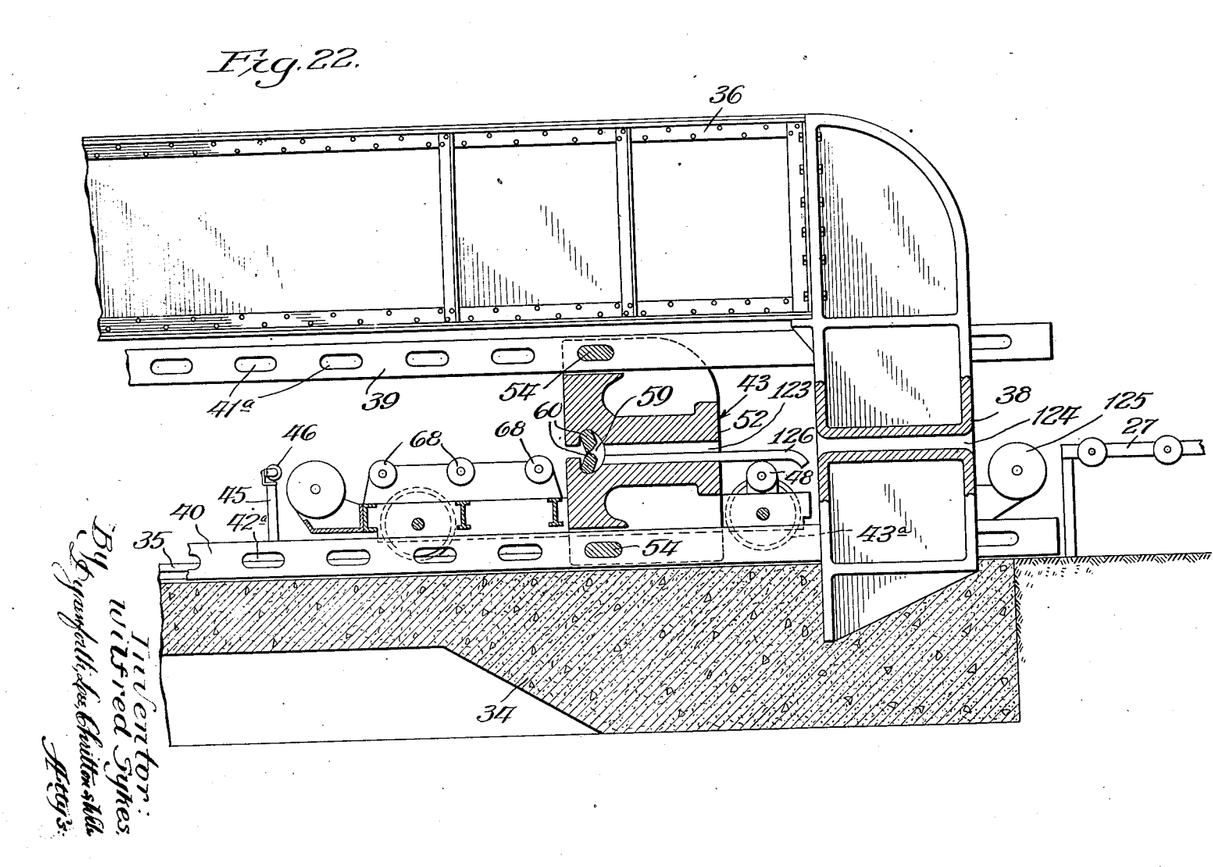
Figure 22, a broken view, in longitudinal section, of a modification of the machine of the preceding figures.

Referring now to Fig. 22, the machine therein shown represents an embodiment of the invention in an arrangement wherein the plates instead of being delivered sidewise into the machine as explained of the machine of the preceding figure, are delivered endwise into the machine as well as discharged endwise from the machine.

The machine of this figure is of the same construction as that of the preceding figures of the drawings except that the chain conveyor mechanisms 69 and 90 are omitted and provision made for the endwise plate delivery above referred to. The view illustrated in Fig. 22 shows the end of the machine corresponding with that illustrated in Figs. 2 and 3, similar parts being given the same designating numerals.

To permit of the endwise delivery of the plate into the machine, the block 52 of the carriage 43 and the leg 38 contains slots 123 and 124, respectively, through which the plate, in traveling along the shear runout table 27 and over a roller represented at 125, passes endwise to become positioned at its opposite ends between the jaws 60 and 78, the plate, after being stretched as above described being delivered endwise out through the end of the machine opposite that shown in Fig. 22 as explained of the construction of the preceding figures. The block 43 is preferably provided at the bottom of the slot 123 with a guide plate 126 partially spanning the space between the leg 38 and the block 43 for insuring the guidance of the plate into the slot 123.

While I have illustrated and described certain particular embodiments of my invention, I do not wish to be understood as intending to limit it thereto as the same may be variously modified and altered without departing from the spirit of my invention.

What I claim as new, and desire to secure by Letters Patent, is:

1. A stretching machine comprising spaced apart members for engaging the ends of the work, said members being relatively movable to perform the stretching operation, said members having openings therethrough for lengthwise movement of the work into, and out of, the machine and means for moving the work lengthwise in the machine.

2. A stretching machine comprising spaced apart members for engaging the ends of the work, said members being relatively movable to perform the stretching operation, said members having openings therethrough for lengthwise movement of the work into and out of the machine, means to move the work lengthwise in the machine, and means to move the work into and out of the machine.

3. A stretching machine comprising spaced apart members for engaging the ends of the work, said members being relatively movable to perform the stretching operation, said members having openings therethrough for lengthwise movement of the work into and out of the machine, and means to move the work lengthwise into and through the machine.

4. A stretching machine comprising spaced apart members for engaging the ends of the work, said members being relatively movable to perform the stretching operation, one of said members having an opening therethrough for lengthwise movement of the work in the machine, and means for moving said work lengthwise in the machine.

5. A stretching machine comprising spaced apart members for engaging the ends of the work, said members being relatively movable to perform the stretching operation, one of said members having an opening therethrough for lengthwise movement of the work out of the machine and skids at the side of the machine for delivery of the work crosswise into the machine.

6. A stretching machine comprising spaced apart members for engaging the ends of the work, said members being relatively movable to perform the stretching operation, and containing recesses, having flaring throats, opening through the sides of said members to receive the ends of the work, and clamping means for the ends of the work received into said recesses.

7. A stretching machine comprising spaced apart members for engaging the ends of the work, said members being relatively movable to perform the stretching operation, and means for actuating one of said members for producing said relative movement and comprising elements located above and below the plane occupied by the work in the machine to provide a space for lengthwise movement of the work, the one of said members actuated by said means having an opening therethrough for lengthwise movement of the work.

8. A stretching machine comprising spaced apart members for engaging the ends of the work, said members being relatively movable to perform the stretching operation and hydraulic means for actuating one of said members for producing said relative movement and comprising upper and lower sets of piston and cylinder mechanisms located above and below the plane occupied by the work in the machine to provide a space for lengthwise movement of the work, the one of said members actuated by said means having an opening therethrough for lengthwise movement of the work.

9. A stretching machine comprising spaced apart members for engaging the ends of the work, said members being relatively movable to perform the stretching operation, means for actuating one of said members for producing said relative movement and comprising elements located above and below the plane occupied by the work in the machine, to provide a space for lengthwise movement of the work, and a movable cross-head operated by said means and operatively engaging said last-referred-to member for actuating the latter, said cross-head having an opening therethrough for lengthwise movement of the work.

10. A stretching machine comprising spaced apart members for engaging the ends of the work, said members being relatively movable to perform the stretching operation, and conveyor means on said members operating crosswise of the machine for delivering the work into the machine.

11. A stretching machine comprising spaced apart members for engaging the ends of the work, said members being relatively movable to perform the stretching operation, skids at the side of the machine upon which the work is moved crosswise toward the machine, and conveyor means on said members operating crosswise of the machine for delivering the work from the skids into the machine.

12. In a machine of the character set forth, a clamping-means-supporting member containing a recess, and clamping means comprising movable jaws in said recess, said member containing a drainage passage opening into said recess at substantially its lowest point so as to permit drainage from the recess of scale or other particles which if not removed therefrom will form an obstruction to movement of the jaws to open position.

13. In a machine of the character set forth, a clamping-means-supporting member containing a recess opening through a face of said member, clamping means comprising movable upper and lower jaws in said recess, and a freely pivoted guard plate associated with said lower jaw to move therewith and slidably bearing on the bottom wall of said recess.

14. In a machine of the character set forth, a clamping-means-supporting member containing a recess opening through a face of said member, clamping means comprising movable upper and lower jaws in said recess, and a guard plate hinged to said lower jaw and slidably bearing on the bottom of said recess.

15. A stretching machine comprising spaced apart members for engaging the ends of the work, said members being relatively movable to perform the stretching operation, one of said members having an opening therethrough for lengthwise movement of the work therein, and skids at the side of the machine along which to move the work crosswise of the machine.

16. A stretching machine comprising spaced apart members for engaging the ends of the work each of said members being movable relative to the other thereof, means adapted to anchor one of said members selectively at different spaced apart points along its path of movement to vary the spacing thereof from the other of said members, and means for moving the other of said members in a direction to stretch the work engaged by said members, said second named means being operative to move the member actuated thereby a greater distance than the length of the spaces between said points of anchorage.

17. A stretching machine comprising spaced apart members for engaging the ends of the work each of said members being movable relative to the other thereof, means adapted to anchor one of said members selectively at different spaced apart points along its path of movement to vary the spacing thereof from the other of said members, and hydraulic means for moving the other of said members in a direction to stretch the work engaged by said members, said second-named means being adapted to move the one of said members actuated thereby a greater distance than the length of the spaces between said points of anchorage.

18. A stretching machine comprising spaced apart members for engaging the ends of the work, each of said members being movable relative to the other thereof, a stationary bar extending lengthwise of the machine and containing a series of spaced apart apertures therealong, means for engaging one of said members and for selective introduction into said apertures for anchoring said last-referred-to member to said bar, and means for moving the other of said members in a direction to stretch the work engaged by said members, said second-named means being operative to move the member actuated thereby a greater distance than the length of the spaces between said points of anchorage.

19. A stretching machine comprising spaced apart members for engaging the ends of the work, each of said members being movable relative to the other thereof, a stationary bar extending lengthwise of the machine and containing a series of spaced apart apertures therealong, means for engaging one of said members and for selective introduction into said apertures for anchoring said last referred to member to said bar, and hydraulic means for moving the other of said members in a direction to stretch the work engaged by said members, said second-named means being adapted to move the one of said members actuated thereby a greater distance than the length of the spaces between said apertures.

WILFRED SYKES.